(No Model.)

F. A. BROWNELL.
PHOTOGRAPHIC CAMERA.

No. 605,851.

3 Sheets—Sheet 1.

Patented June 21, 1898.

Witnesses.
G. Willard Rich.
Grace A. Roda

Inventor.
Frank A. Brownell
by Frederick F. Church
his Attorney.

(No Model.)  3 Sheets—Sheet 2.

F. A. BROWNELL.
PHOTOGRAPHIC CAMERA.

No. 605,851. Patented June 21, 1898.

Witnesses.
G. Willard Rich.
Grace A. Roda.

Inventor.
Frank A. Brownell
by Frederick H. Church
His Attorney.

(No Model.) 3 Sheets—Sheet 3.
F. A. BROWNELL.
PHOTOGRAPHIC CAMERA.
No. 605,851. Patented June 21, 1898.
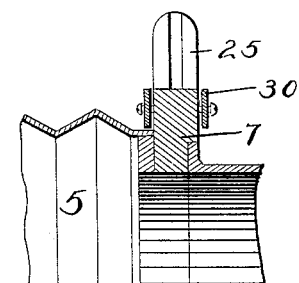
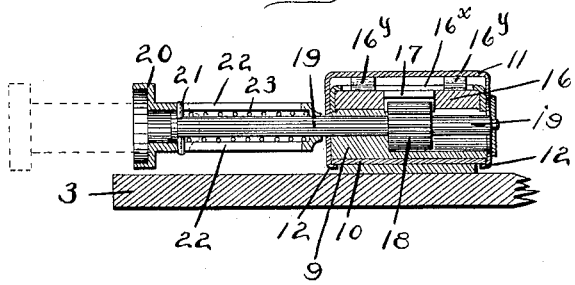
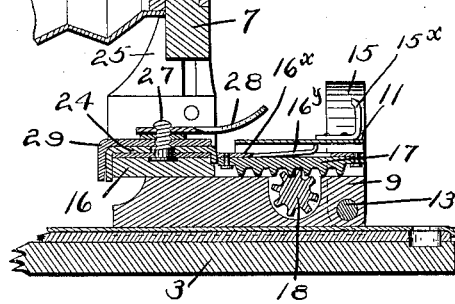
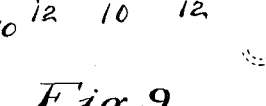
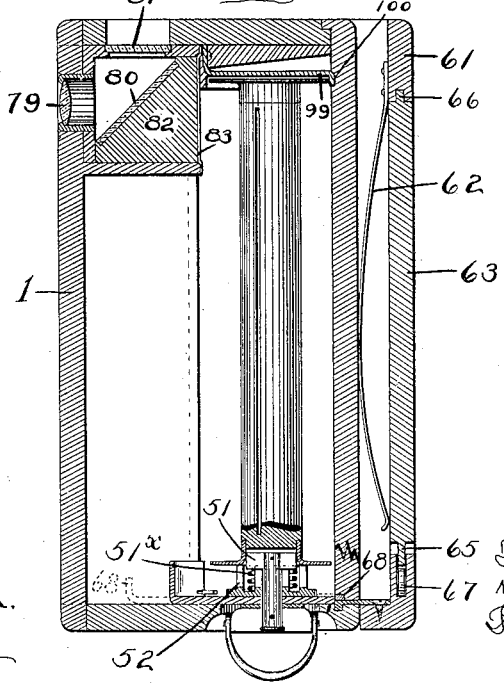
Witnesses.
G. Willard Rich.
Grace A. Roda
Inventor.
Frank A. Brownell
by Frederick F. Church
his Attorney.
THE NORRIS PETERS CO., PHOTO-LITHO., WASHINGTON, D. C.

United States Patent Office.

FRANK A. BROWNELL, OF ROCHESTER, NEW YORK, ASSIGNOR TO THE EASTMAN KODAK COMPANY, OF SAME PLACE.

PHOTOGRAPHIC CAMERA.

SPECIFICATION forming part of Letters Patent No. 605,851, dated June 21, 1898.

Application filed April 5, 1897. Serial No. 630,693. (No model.)

*To all whom it may concern:*

Be it known that I, FRANK A. BROWNELL, of Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and to the reference-numerals marked thereon.

My present invention relates to photographic cameras, and has for its object to provide a form of apparatus that is capable of being folded into small compass for carrying and in which either rollable film or photographic plates or cut film may be used, the adaptation from one to the other being readily accomplished; and to these and other ends it consists in certain improvements hereinafter more specifically described, the novel features being pointed out in the claims at the end of this specification.

Figure 1:
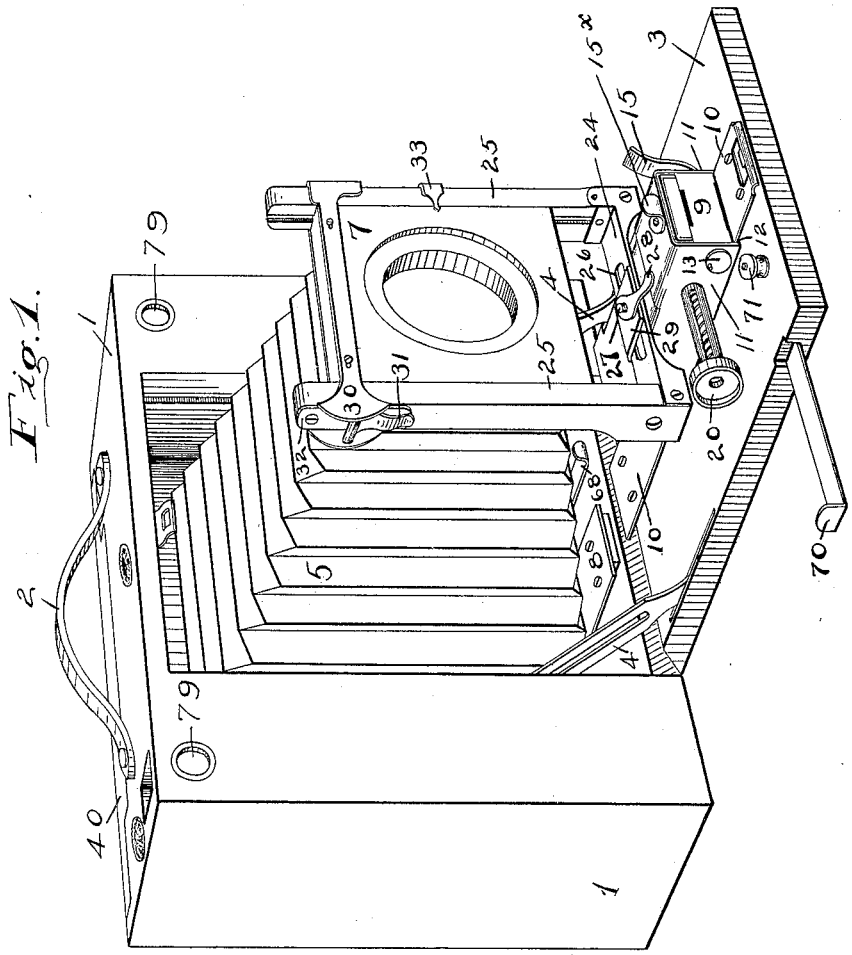
Figure 2:
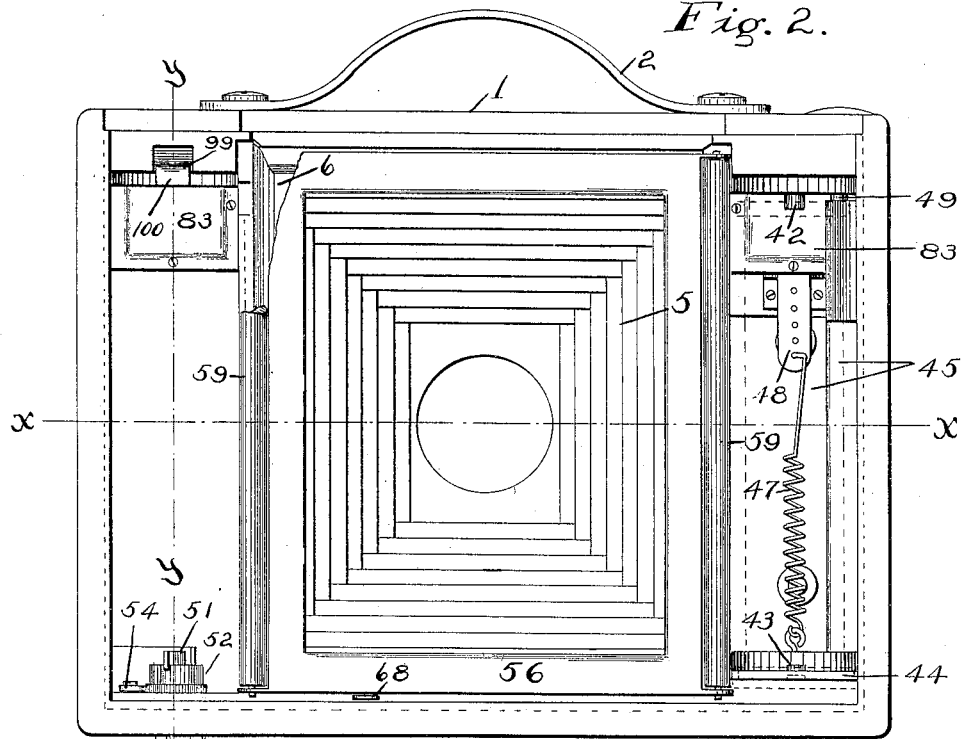
Figure 3:
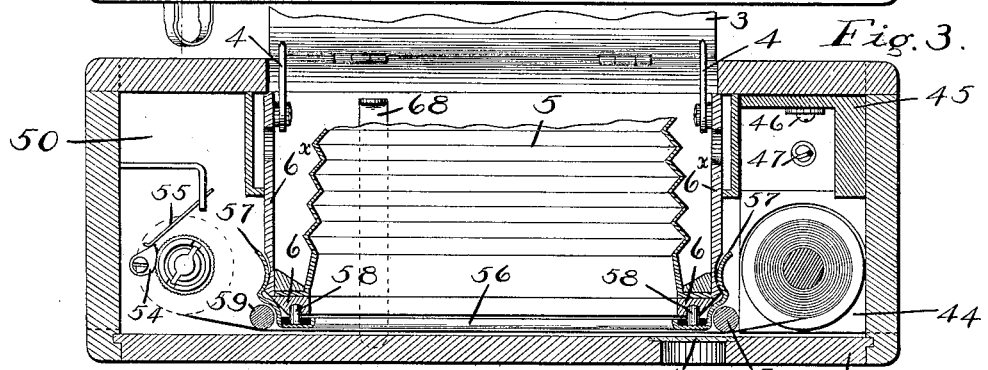
Figure 4:
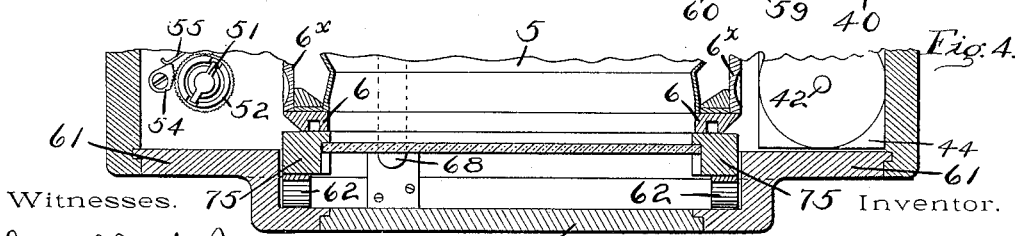

In the drawings, Figure 1 is a perspective view of a camera constructed in accordance with my invention, with the bellows extended and in condition for use; Fig. 2, a rear view with the cover removed; Fig. 3, a horizontal sectional view, on the line $xx$ of Fig. 2, showing the manner of using the camera with rollable film; Fig. 4, a similar view showing the camera adapted for using plates or cut sheets of film; Fig. 5, a vertical sectional view through the front or lens board; Fig. 6, a cross-sectional view through the focusing mechanism; Fig. 7, a cross-sectional view showing the clamping device for securing the front-board carriage to the way; Fig. 8, a detail sectional view of the means for securing the front or lens board when adjusted vertically; Fig. 9, a vertical sectional view on the line $yy$ of Fig. 2.

Similar reference-numerals indicate similar parts.

In carrying out my invention I provide a main box or casing 1, provided with a carrying-handle 2 and having at the front a hinged door 3, narrower than the length of the casing and adapted to be supported when extended by the usual slotted arms 4, said door forming a bed or support for the camera-front.

5 indicates the collapsible bellows, secured to the frame 6 at the rear of the casing and connected at its forward end to the front or lens board 7. In the lower portion of the casing is a plate or way 8, on which the front carriage 9 is adapted to be moved. 10 indicates a similar way formed upon the lid or door 3, as shown particularly in Fig. 1, and forming a continuation of the way 8 when the door is open.

The carriage 9 is provided with a cover-plate 11, having the ears 12 extending beneath the sides of the plates 8 and 10, and passing through the carriage and the plate 11 is a bolt 13, secured from rotation by a pin 14 and having upon its end a clamping-lever 15, as shown particularly in Fig. 7, which latter operates when tightened to secure the carriage upon the way. In order that the carriage may not be moved backward when tightening the lever 15, I provide a small lug $15^x$, which the operator may engage with his thumb.

Mounted upon the carriage 9 and movable longitudinally thereof is a slide 16, upon which the lens-board is indirectly mounted, said slide being provided on its upper side with a plate $16^x$, to the under side of which is attached a rack 17. The plate $16^x$ is provided with spring-fingers $16^y$, which engage with the under side of the plate 11, and thereby offer frictional resistance to the adjustment of the slide, and coöperating with slight notches formed in the under side of said plate 11 serve not only to hold the plate in its normal position, but as a means of indicating to the operator the position of the slide. The rack 17 meshes with a pinion 18 on a transverse arbor 19, journaled in the carriage, and sliding longitudinally upon this arbor is a sleeve 20, having its outer end milled and connected to the arbor by a pin 21, operating in slots 22 in said sleeve, the sleeve and arbor constituting an extensible arbor, a spring 23 being arranged between the inner end of the sleeve and the pin and operating to draw said sleeve inward and maintain it in the position shown in full lines in Fig. 6. When desired to move the slide independently of the carriage, which is clamped to the front board, as for the purpose of a fine focusing adjustment, the arbor may be extended by moving the sleeve outward, as shown in dotted lines in Fig. 6, and then rotated to cause the adjustment. When the sleeve is released, the spring will draw it inward to the position in full lines, so it will be out of the way when the door 3 is turned up. It will thus be seen that the operator may obtain an approximate adjustment by the movement of the carriage 9 and then focus accurately.

24 indicates a plate to which are secured the standards 25, forming a frame, in which the front or lens board 7 is vertically adjustable, said plate 24 being preferably formed of sheet metal and provided with a slot 26, through which passes a bolt 27, having an adjustable nut 28 thereon above the transverse portion of the plate, a plate 29 being arranged between the nut and the frame, as shown particularly in Fig. 5. The front board 7 is movable vertically on the standards 25 and is arranged to be clamped in position thereon by means of a metal strap 30, extending around the standards, connected loosely to the lens-board, and provided at one end with a cam 31, pivoted between the free ends of the clamp and engaging one of the standards or, preferably, a plate 32, secured thereto, as shown in Figs. 1 and 8. From this it will be seen that when the clamp is loosened the lens-board may be adjusted vertically and secured in adjusted position by operating the clamp to the position shown in Figs. 1 and 8. The central position may be insured by the employment of an index 33.

The casing 1 is open at the rear side and adapted to be closed by a vertically-sliding board 40, rabbeted at the edges, and at opposite sides of the frame 6 are provided chambers for the reception of spools carrying rollable film, the upper end of one of said chambers being provided with a downwardly-projecting stud or pin 42 for centering the spool, while the lower end of this spool is carried by a similar projection 43, mounted upon a slide embodying the end piece 44 and the two longitudinally-extending pieces 45, sliding in the corner of the casing and guided by screws 46. This slide is moved vertically by a spring 47, connected to a suitable eye at the lower end and at the upper adapted to be inserted in one of a series of perforations formed in the plate 48, so that the required amount of tension on the ends of the film-spool may be adjusted, if desired. The extreme upper end of the slide is provided with a rod 49, extending to the exterior of the casing and covered by the covering material of the latter. The end may be pressed down to move the slide and reduce the friction on the film-spool, or an extreme movement will permit the disengagement and removal of the spool when desired.

The chamber 50 on the other side of the casing, adapted to receive the winding spool or reel, is provided at one end with a longitudinally-movable key 51, pressed inward by a spring $51^x$ and adapted to engage and operate a film-spool placed thereon, while the opposite end of this chamber forms a seat for the upper end of the spool, and a spring 99, having a downwardly-extending end 100, centers the spool in its movements. The sleeve 52, through which the key 51 operates, is provided with a ratchet-surface, with which coöperates a pawl 54, operated upon by a spring 55 to prevent backward rotation of the key, as will be understood.

56 indicates a frame, preferably of sheet metal, removably connected to the rear side of the frame 6, in the present instance by spring-arms 57, adapted to engage suitable recesses formed in the outer sides of the partition-plates $6^x$, and said frame is also steadied by pins 58 entering suitable apertures in said frame 6. Journaled in ears formed at the sides of this frame are vertically-extending rollers 59, which when the frame is in the position shown in Fig. 3 operate to hold the film in the proper focal plane, and as the camera is adapted for reloading in daylight the back of the film is covered by a black paper containing suitable indicia, which are visible through a small red glass plate 60, located at one side of the rear board 40.

When it is desired to use plates or cut sheet-film in the camera or to focus, it is only necessary to remove the frame 56 entirely, so that the focusing-frame or plate-holder may abut directly against the back of the frame 6, and thereby bring the glass, sheet-film, or plate into the proper focal plane, and in order that this may be accomplished and the glass frame or plate-holder properly held I provide a vertically-sliding door 61, adapted to slide in the ways formerly occupied by the frame 40, said door 61 being recessed to provide for the accommodation of the plate-holder or the ground-glass frame 75, and also provided with springs 62 to hold said glass frame or plate-holder in proper position against the frame 6. A removable door 63 is also arranged in the extension-frame 61, which may be removed when desired for focusing.

Any suitable means may be provided for holding the door 63 in place; but I prefer to provide it with the long flange 65 at the lower end and a short flange 66 at the upper end, adapted to enter corresponding slots at the ends of the opening in the rear, and provide a suitable spring 67 in the lower slot, serving to hold the door with its upper flange or rabbet engaged, as shown particularly in Fig. 9.

In order that the rear doors or slides 40 and 61 may be secured in position, I provide in the bottom of the casing a sliding bolt 68, adapted to engage a suitable locking-plate secured to the lower end of said door, as shown more particularly in Fig. 9.

In order that the camera may be used when lying on its side on a flat surface and as the casing is narrow and would not properly support it when the front is moved out, I provide the door 3 with the slide or rod 70, operating in a suitable slot therein and held in adjusted position by means of a set-screw 71 on the door, this plate being capable of being moved out substantially flush with the end of the casing and secured in this position by the set-screw, and when not in use it may be moved in, with its end flush with the end of the door 3, so that the latter may close within the casing.

I prefer to employ two finders in the casing, one to be used when the camera is horizontal and the other when vertical, each finder embodying a lens 79, mirror 80, and ground glass 81, secured in a box 82, made as a separate structure from the camera and held in a suitable chamber formed in the main casing by a cover-plate 83, as in Fig. 9. This construction enables the finders to be made in quantities, and therefore rapidly, and then applied to the cameras afterward in a simple manner.

I claim as my invention—

1. The combination with the bed or support, a way thereon, a carriage adjustable on the way, and means for securing it thereto, of the slide on the carriage, the rack-and-pinion connection between them, the frame on the slide and laterally adjustable thereof, and the front board vertically adjustable in the frame, and means for securing said parts rigidly, substantially as described.

2. The combination with the bed or support, a way thereon, the carriage adjustable on the way, and means for securing it, the slide on the carriage having the rack, the arbor and the pinion coöperating therewith, the plate on the carriage adjustable laterally thereof, the standards secured to the plate, the front board vertically adjustable on the standards and securing devices between them, substantially as described.

3. In a camera, the combination with the bed or support, the way thereon, the carriage adjustable on the way, the arbor mounted in stationary bearings on the carriage, having the extensible outer portion and the pinion on said arbor, of the slide movable on the carriage, the rack thereon in constant engagement with the pinion and the front board carried by the slide, substantially as described.

4. In a camera, the combination with the casing, having the way, the folding door having the way thereon, coöperating with the way on the casing, the carriage adjustable on the way, and securing devices therefor, of the slide carrying the front board movable on the carriage, a rack-and-pinion connection between the slide and carriage, an extensible arbor to which the pinion is connected, and a spring for retracting the outer member of the arbor within the edge of the door, whereby the latter may be closed, substantially as described.

5. In a camera, the combination with the casing having the way, the hinged door, the way thereon coöperating with the way in the casing, the carriage movable on said ways, a locking device for the carriage, the arbor on the carriage, and the pinion thereon, of the slide movable on the carriage having the rack engaging the pinion, the sleeve on the arbor movable longitudinally thereof, and having the wheel at its outer end, the spring for retracting the sleeve, and the front board carried by the slide, substantially as described.

6. In a camera, the combination with the carriage, the slide adjustable thereon, the plate $16^x$ having spring-fingers $16^y$ thereon, in frictional engagement with the carriage, the rack on the plate $16^x$, the movable pinion on the carriage coöperating with the rack, and the front board carried by the slide.

7. In a camera, the combination with the carriage, the slide adjustable thereon, the transverse plate 24 having the slot and adjustable transversely of the slide, the standards 25 thereon, and the bolt for securing the plate to the slide, of the front board sliding between the standards, and securing devices for fastening the board to the standards, substantially as described.

8. In a camera, the combination with the standards and the front board sliding vertically between them, of the strap 30 secured to the board passing around the standards, and the cam 31 for securing the parts together, substantially as described.

9. In a camera, the combination with the casing, of the hinged door narrower than the casing, ways in the casing and on the said door, and the camera-front movable on said ways, of the extensible rod 70 mounted on the door and adapted to be extended to substantially the width of the casing to support the forward end of the door when the camera is on its side, as set forth.

10. In a camera, the combination with the casing having the central exposing-chamber, the open film-chambers on opposite sides thereof, and the casing-back for closing them, of the spool-centering projection 42 in one of the film-chambers, the sliding frame having the end piece 44 provided with the spool-centering projection, and the adjustable spring for operating the end piece 44 to hold the spool, substantially as described.

11. In a camera, the combination with the casing having the spool-chamber, of the spool-centering device therein, the frame sliding in the chamber and having the end piece for coöperating with a film-spool, the spring connected to said frame and the plate having a series of apertures with which the spring may be connected to regulate the tension of the springs, substantially as described.

12. In a camera, the combination with the casing open at front and back having ways in the front, and the hinged door at the front having the ways, the carriage movable on said ways, and the camera-front on the carriage, of the bellows connected to the front, the frame 6 at the rear of the casing narrower than the latter, film-chambers in the casing on opposite sides of the frame and open at the rear, the removable frame 56 having rollers at opposite sides, detachable connections between the frames 6 and 56, and the removable back for the casing adapted when removed to permit access to the film-chambers and to the frame 56, substantially as described.

13. In a camera, the combination with the casing open at the rear and the sliding door for closing it, of the frame 6 at the rear of the casing, the film-chambers on opposite sides of the frame 6 open at the rear, and the removable frame 56 having the rollers at opposite sides thereof, and detachable connections between said frames 5 and 56, substantially as described.

14. In a camera, the combination with the casing open at the back, having the central exposing-chamber, and the film-chambers at the sides thereof, also open at the back, of the removable casing-back 61 sliding in ways on the casing, having the removable door 63, and the springs 62, substantially as described.

15. In a camera, the combination with the casing open at front and rear, the hinged door at the front having ways, and the camera-front movable on said ways, of the removable back for the casing, and the locking-bolt 68 for securing the casing-back, accessible from within the front of the casing, substantially as described.

16. In a camera, the combination with the casing open at the back, having the central exposing-chamber and the film-chambers at the sides thereof, all said chambers being open at the back, of the removable frame 56, having rollers 59 at the sides, between the film and exposing chambers, detachable connections between the frame and the rear of the exposing-chamber, and a removable back for the casing permitting access to both the frame and film chambers when removed, substantially as described.

FRANK A. BROWNELL.

Witnesses:
F. F. CHURCH,
G. A. RODA.